(12) United States Patent
Donadini

(10) Patent No.: US 8,451,099 B2
(45) Date of Patent: May 28, 2013

(54) METHOD FOR DUPLICATING ELECTRONIC VEHICLE KEYS WITH MUTUAL AUTHENTICATION

(75) Inventor: Michele Donadini, Ponzano Veneto (IT)

(73) Assignee: SILCA S.p.A., Vittorio Veneto (IT)

( * ) Notice: Subject to any disclaimer, the term of this patent is extended or adjusted under 35 U.S.C. 154(b) by 0 days.

(21) Appl. No.: 13/392,875

(22) PCT Filed: Sep. 27, 2010

(86) PCT No.: PCT/EP2010/064281
§ 371 (c)(1),
(2), (4) Date: Mar. 1, 2012

(87) PCT Pub. No.: WO2011/039148
PCT Pub. Date: Apr. 7, 2011

(65) Prior Publication Data
US 2012/0154127 A1    Jun. 21, 2012

(30) Foreign Application Priority Data
Oct. 2, 2009  (IT) .............................. VE2009A0054

(51) Int. Cl.
*G06K 7/01* (2006.01)

(52) U.S. Cl.
USPC .................. 340/10.51; 340/10.52; 340/5.21; 340/5.22; 340/5.61; 340/426.14; 380/270

(58) Field of Classification Search
USPC ....... 340/5.21–5.22, 5.61–5.64, 10.51–10.52, 340/426.13–426.14; 380/270
See application file for complete search history.

(56) References Cited

U.S. PATENT DOCUMENTS
2011/0123026 A1*  5/2011  Rebuli .......................... 380/270

FOREIGN PATENT DOCUMENTS
| DE | 4418069 | 8/1995 |
|---|---|---|
| GB | 2424293 | 9/2006 |
| WO | 2008145199 | 12/2008 |

OTHER PUBLICATIONS

Anonymous: "ID 46 Solution", Zoulas company website: http://www.zoulas.gr/, Sep. 5, 2009, XP002606821, Retrieved from the Internet: URL:http://www.zoulas.gr/era3.pdf [retrieved on Oct. 25, 2010].

Anonymous: "Silca News Jul. 2009", Company website: http://www.silca.biz, Internet Article, Jul. 1, 2009, XP002569212 , Retrieved from the Internet: URL:http://www.silca.biz/Italy/224736_327958/nr-07-2009_pdf.pdf [retrieved on Feb. 18, 2010].

(Continued)

*Primary Examiner* — George Bugg
*Assistant Examiner* — Sharmin Akhter
(74) *Attorney, Agent, or Firm* — Themis Law

(57) ABSTRACT

A method for duplicating electronic keys with mutual authentication includes: applying temporarily, to an original electronic key, an inductive reader for signals exchanged between the key transponder and the vehicle immobilizer control unit; activating the vehicle instrument panel at least twice with the original key to cause the inductive reader to acquire the RDN1, RDN2, SIG1 and SIG2 codes transmitted by the control unit; connecting the inductive reader to a transponder reader/writer to transfer all acquired data; determining the non-readable SK code of the immobilizer control unit via the reader/writer by using a function inverse to that creating the SIG code from the ID, RND, SK codes and the acquired data; reading from the original key, via the reader/writer, using the non-readable SK code, any other data memorized therein, reading the ID code from the original key, via the reader/writer; and memorizing in a new key all the read data.

7 Claims, 2 Drawing Sheets

OTHER PUBLICATIONS

Anonymous: "SILCA ID46—Solution FastCopy", Company website: http://www.silca.biz, Internet Article, Jul. 1, 2009, XP002569222, Retrieved from the Internet: URL:http://www.silca.biz/it/33866_323570/silca-id46solutionfastcopy_it_pdf.pdf [retrieved on Feb. 18, 2010].

Anonymous: "SILCA ID46 Solution—RW4", Company website: http://www.silca.biz, Internet Article, 1 Jul. 2009, XP002569232, Retrieved from the Internet: URL:http://www.silca.biz/it/33866_323574/silca-id46solutionrw4_it_pdf.pdf [retrieved on Feb. 18, 2010].

Anonymous: "Silca Fast Copy Plus: The Transponder Programming Solution", Company website: http://www.silca.biz, Internet Article, Jul. 1, 2009, XP002569234, Retrieved from the Internet: URL:http://www.silca.biz/ en/ 33866_333466/fast-copy-plus-technical-solution_en_pdf.pdf [retrieved on Feb. 18, 2010].

* cited by examiner

METHOD FOR DUPLICATING ELECTRONIC VEHICLE KEYS WITH MUTUAL AUTHENTICATION

FIELD OF THE INVENTION

The present invention relates to a method for duplicating electronic vehicle keys with mutual authentication.

BACKGROUND OF THE INVENTION

Electronic keys for motor vehicles are known; they differ from traditional mechanically cut keys with mechanical notching by being able not only to mechanically release the steering column when inserted into the corresponding lock located in proximity to this column, but also to enable the electronic control unit (immobilizer), which in its turn controls particular units vital for the motor vehicle operation. This further function is performed by radio or infrared reception/transmission signals.

These electronic keys have certainly increased the safety level of motor vehicles against theft, even though the digital information contained in their memory can be easily read and be memorized in a cloned key, which can be freely used instead of the original key.

In order to avoid these drawbacks and to make electronic key duplication more difficult, it has been proposed (U.S. Pat. No. 5,596,317) to use, for information exchange between the electronic key and the motor vehicle vital units, a personalized algorithm with a non-readable secret code, which differs from vehicle to vehicle. When the key is inserted into the corresponding vehicle ignition switch, its control unit generates a random number and transmits it via radio to the key, which processes it with a personalized algorithm, and returns the result of this processing to the control unit. The control unit, which already possesses the personalized algorithm, executes reverse processing to obtain the random number, and then compares it with the number originally generated. The same procedure then takes place between the control unit and the other vital units of the vehicle.

In this case, key duplication is evidently made more difficult given the ignorance of the secret key code.

WO 2008/14199 has also solved the problem of duplicating keys provided with a non-readable secret code. In particular, to identify that code, all the readable data of the original key are transmitted by the authorized duplication centre to a remote computer managed by a person in possession of the non-personalized algorithm and able to obtain the secret code from the result of processing this by the key using the personalized algorithm, and which is then transmitted to the duplication centre for use in duplicating the original key.

A drawback of this solution is that the electronic key can be read and be duplicated by equipment possessing the non-personalized algorithm.

In order to also eliminate this drawback and make the duplication of an electronic key even more difficult, so-called mutual recognition or mutual authorization keys have been proposed.

These are provided with a head housing a receiver/transmitter (transponder) able to dialogue with the electronic control unit of the immobilizer on board the vehicle, to recognize the code and be recognized thereby (mutual authentication).

For this purpose, the memory associated with the key transponder stores a unique identity number (ID), at least one non-readable code (SK), a response code (RESPONSE) and possibly a set of other data, which overall form the memory "pages".

The mutual authentication provides for the key, once inserted into the vehicle ignition switch, to transmit its ID via the transponder to the control unit. This, on verifying that the key ID corresponds to one of the IDs inserted into its memory, sends to the transponder a first random number (RND) followed by a second number (SIG) obtained by a specific algorithm (f) based on the key identification code ID, on the first random number RND, and on the non-readable SK code memorized in the control unit and identical to the non-readable key code (SIG=f(ID, RND. SK).

The key, in possession of the first random number, then makes the same calculation using the same algorithm f, the ID and SK data which it possesses and the RND value received from the immobilizer control unit. If the result of this calculation is identical to the second number SIG received from the control unit, this signifies that mutual recognition has occurred between the key and the control unit; the key transmits the RESPONSE to the control unit, i.e. the signal that mutual recognition has taken place, together with any other data memorized therein, the control unit then enabling the ignition operations.

In practice it is frequently necessary to duplicate an electronic vehicle key of the aforedescribed type, starting from the original or from an already enabled key, however this duplication, i.e. the electronic coding, is extremely complex, given the impossibility of obtaining the non-readable SK code of the original key together with all the other data, excluding the identification number ID, stored therein and required for obtaining mutual control unit recognition.

In order to solve this problem it has already been proposed to read, with a traditional transponder reader/writer, the ID code of the original key to be duplicated and, after having written it onto a new key previously mechanically notched to correspond to the original key, to then make at least two successive vehicle instrument panel activation attempts. These two attempts will evidently not be successful, but they enable two first numbers RND1 and RND2 and two second numbers SIG1 and SIG2 to be recovered from the control unit which have been generated following recognition of the identification number ID.

These numbers, when transferred into the transponder reader, enable this to determine the non-readable SK code of the control unit by calculating it with the inverse function $f^{-1}$, already implemented in the transponder reader software.

With this and with one of the pairs of RDN and SIG data previously acquired by the new key and transferred thereby to the transponder reader/writer, it is possible to read from the original key, via the reader/writer, all the other data stored therein and to write them into the new key, which becomes to all effects a clone of the original key.

This known method overcomes all the past obstacles in duplicating this type of electronic key which were due to the impossibility of acquiring the non-readable SK code from the original key, essential to duplicate the electronic part of the key, however at the same time it has presented certain drawbacks, which the present invention proposes to eliminate.

A first drawback consists of the fact that the method operates on the assumption that by means of its attempts to recognize the new key inserted into the vehicle ignition switch, the immobilizer control unit thereof transmits at least two separate RDN numbers and at least two separate SIG numbers necessary to determine the non-readable SK code via the inverse function $f^{-1}$(ID, RND, SK). If however the immobilizer control unit is programmed such that, after a first unsuccessful recognition attempt, it provides the same RDN and SIG numbers previously provided, it will never be possible to obtain the SK number starting from the inverse function $f^{-1}$.

Another drawback consists of the fact that the immobilizer control unit memorizes an error representing an anomalous fact and could result in unforeseeable consequences by the control unit.

Another drawback consists of the fact that if the original key also presents mechanical notching, the new key must be notched mechanically before starting electronic duplication, independently of whether this can have a positive conclusion.

SUMMARY OF THE INVENTION

An object of the invention is to eliminate these drawbacks by reliably duplicating an original electronic key without resorting to abortive recognition attempts.

This and other objects which will be apparent from the ensuing description are attained, according to the invention, by a method for duplicating electronic vehicle keys with mutual authentication as described hereinafter.

BRIEF DESCRIPTION OF THE DRAWINGS

A preferred embodiment of the present invention is further clarified hereinafter with reference to the accompanying drawings, in which.

DETAILED DESCRIPTION OF A PREFERRED EMBODIMENT

Figure 1:
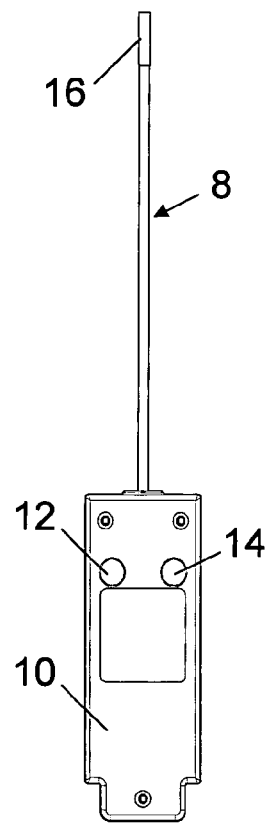
FIG. 1 is a side view of an inductive reader used in the method of the invention.
Figure 2:
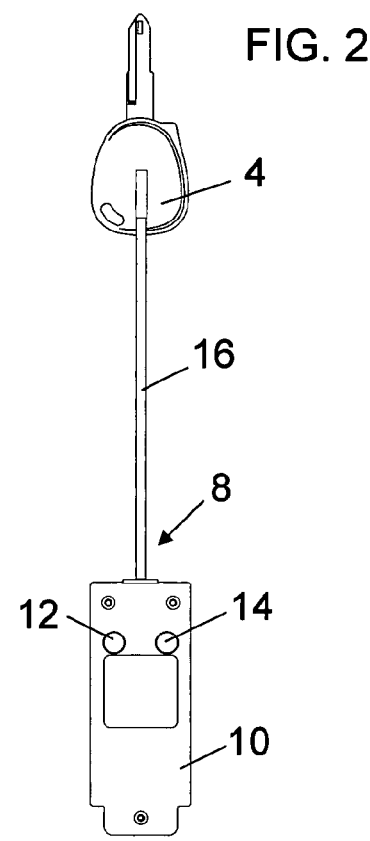
FIG. 2 shows it applied to an original key to be duplicated.
Figure 3:
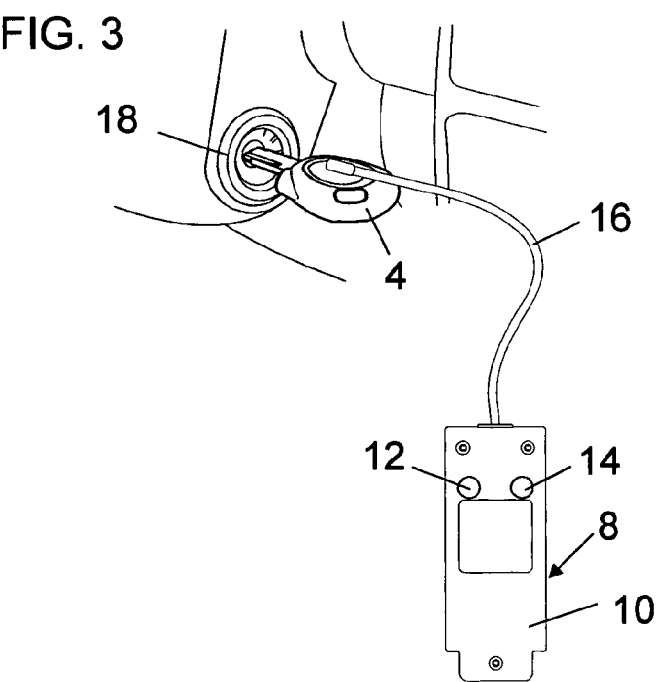
FIG. 3 is a perspective view of a vehicle ignition switch with the original key to be duplicated inserted and coupled to the inductive reader.
Figure 4:
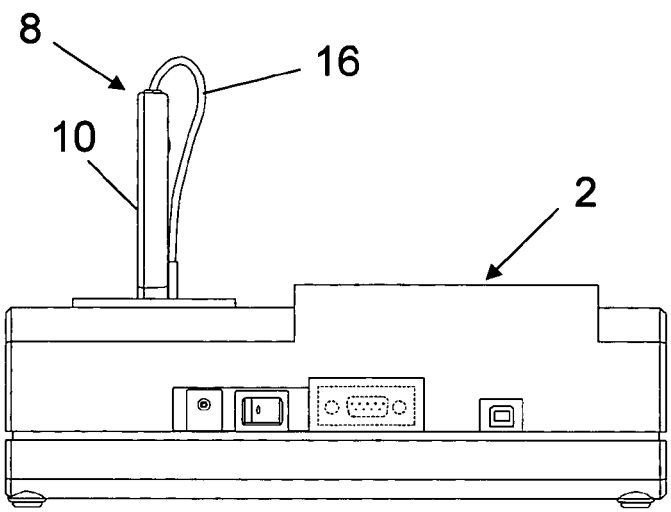
FIG. 4 is a rear view of the inductive reader coupled to a transponder reader/writer, provided with a slot for inserting the original key to be read and the new key to be encoded.
Figure 5:
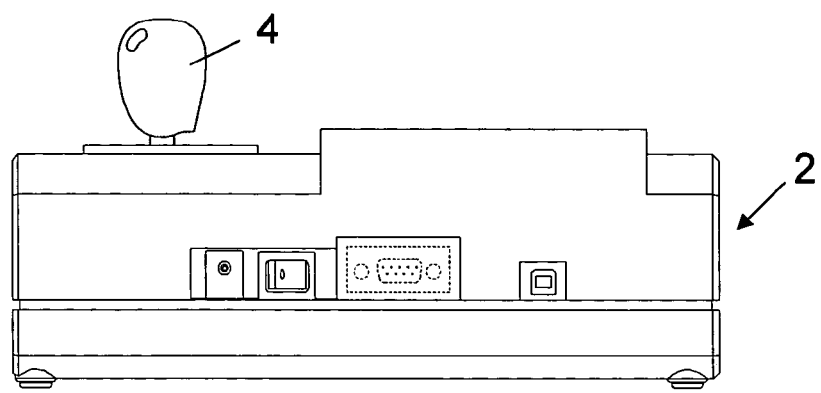
FIG. 5 shows the reader/writer of FIG. 4 with the original key inserted into its slot.
Figure 6:
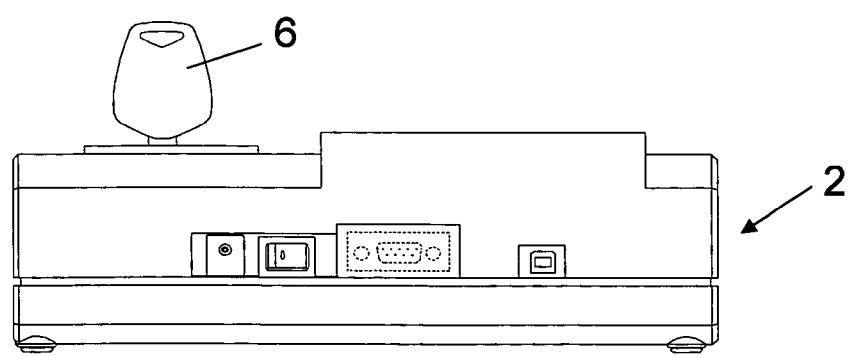
FIG. 6 shows it with the new key to be duplicated inserted into the same slot in place of the original key.

As can be seen from the figures, the method of the invention uses a traditional transponder reader/writer 2 provided with a display screen for displaying the operations to be carried out, a slot for inserting an original key 4 to be read or a new key 6 to be encoded, a seat for inserting an inductive reader 8 and pushbuttons for controlling, in accordance with the operations displayed on the screen, the operations involved in reading from and writing to the key 4 or 6 inserted into the slot in the reader/writer 2.

The inductive reader 8 comprises an electronic circuit housed in a parallelepiped casing 10, a pair of LEDs 12, 14 or other light and/or acoustic indicating means, and a wire antenna 16. The parallelepiped casing houses a microcontroller for controlling the entire operating cycle, a memory in which the data captured by the antenna 67 can be stored, and an electric battery 16.

The method of the invention will be clearer by previously defining the most significant data which intervene in a traditional process of mutual recognition between an electronic key and the control unit of a vehicle immobilizer.

In particular, in the present description:

ID defines the identification number of the original key,

SK defines the non-readable code of the original key and of the control unit,

RND defines the random number generated by the immobilizer control unit when it recognizes the ID code of the key inserted into the vehicle ignition switch, SIG defines a function f calculated by a certain algorithm on the basis of the AD, SK and RND codes, i.e. SIG=f(ID, SK, RND), RESPONSE defines the response of the recognized key, which after being recognized by the immobilizer control unit has itself recognized the control unit.

The first operation consists of physically connecting the inductive reader temporarily in some manner to the original key 4, to maintain it coupled thereto during its use for at least two activation stages, i.e. when the key is inserted into the vehicle ignition switch 18.

After two activation operations, which can take place during normal use of the original key 4, the inductive reader 8, which is present at the data exchange between said original key and the vehicle immobilizer control unit, receives and writes into its memory the ID code transmitted by the original key together with two numbers RND1 and RND2 and two codes SIG1 and SIG2 transmitted by the immobilizer control unit.

For reasons of operational certainty, after the first acquisition the LED 12 flashes, then after the second acquisition the LED 12 remains continuously lit and the LED 14 flashes to indicate completion of the acquisition stage.

The inductive reader 8 can then be separated from the original key 4 and is connected to the transponder reader/writer 2, generally positioned in the shop or in the duplication centre, and generally distant from the vehicle. Following this connection, which essentially involves the wire antenna 16 of the inductive reader and the internal antenna of the reader/writer 2, the calculation process takes place therein, which from a knowledge of the ID, the two RDN1 and RDN2 values and the two SIG1 and SIG2 values, and using the inverse function f−1, enables the non-readable SK code of the control unit to be obtained, which is equal to that of the original key.

When in possession of this SK value, the transponder reader/writer 2 is able to write from the original key 4, previously inserted into its slot, all the data contained in its memory.

After the original key 4 has been removed from the slot of the reader/writer 2 and the new key 6 to be encoded inserted in its place, the transponder reader/writer 2 is able to write into the memory of this latter all the data read from the original key.

The sequence of the various operations involved in reading from the original key 4 and writing to the new key 6 can be executed as an automatic sequence or by stepwise control executed by operating the pushbuttons of the reader/writer 2.

If the new key is to be encoded not only in its electronic characteristics but also in its mechanical characteristics, the mechanical notching can be carried out in traditional manner at any moment, before, during or after electronic encoding, as the two operations can be independent of each other. In particular, this mechanical notching is preferably carried out on termination of the electronic encoding, i.e. when the generally more critical operation has been successful.

In order to prevent any previous memorizations in the inductive reader 8 originating from previous duplication processes from being able to result in mistakes or uncertainties in the duplication operation underway, the inductive reader 8 is preferably connected to the transponder reader/writer 2 before each duplication, in order to be reset.

From the aforegoing, the advantages of the method according to the invention are apparent, and in particular:

it enables most electronic vehicle keys with mutual authentication to be duplicated, it executes the operations involved in extracting data from the vehicle immobilizer control unit using the original key, and is hence insensitive to any prearrangement in the control unit of measures intended to prevent transmission of different data thereby, in the case of reiterated interrogation attempts with a key not yet electronically encoded, it always requires the same operating sequence independently of specific instructions which the control unit could request in the presence of keys not yet electronically encoded to prevent blockage, it does not result in the onset or memorization of any error in the immobilizer control unit, it makes any required mechanical notching operations completely independent of electronic encoding.

The invention claimed is:

1. A method for duplicating electronic vehicle keys with mutual authentication, to be used in vehicles provided with an immobilizer control unit, comprising:

applying temporarily, to an original electronic key to be duplicated, an inductive reader for signals exchanged between a transponder of said original electronic key and the immobilizer control unit;

activating a vehicle instrument panel at least twice with said original electronic key connected to said inductive reader, to cause said inductive reader to acquire RDN1, RDN2, SIG1 and SIG2 codes transmitted by said immobilizer control unit during the two activation steps of said vehicle instrument panel;

connecting the inductive reader to a transponder reader/writer to transfer all acquired data thereto;

determining a non-readable SK code of the immobilizer control unit via said reader/writer by using a function $f^{-1}$ inverse to that a function which creates a SIG value from ID, RND, and SK codes and by using the acquired data;

reading from the original key, via said reader/writer, using said non-readable SK code, any other data memorized therein;

reading an ID value selected among said ID, RND, and SK values from the original key, via said reader/writer, before, during or after any one of the preceding steps; and memorizing in a new key all data read from the original key;

further comprising, in a case of key with mechanical notching, the step of mechanically notching said new key at any stage of acquiring the data resident in the original key and memorizing said data in said new key.

2. The method as claimed in claim 1, wherein the step of applying temporarily, to an original electronic key to be duplicated, an inductive reader comprises applying an inductive reader with a wire antenna.

3. The method as claimed in claim 2, further comprising the step of coupling the wire antenna of the inductive reader to an antenna of the reader/writer.

4. The method as claimed in claim 1, wherein the step of applying temporarily, to an original electronic key to be duplicated, an inductive reader comprises applying an inductive reader provided with a microcontroller and memory, into which the data acquired during information exchange between the original key inserted into a vehicle ignition switch and the immobilizer control unit are written.

5. The method as claimed in the step of applying temporarily, to an original electronic key to be duplicated, an inductive reader comprises applying an inductive reader emitting a signal indicating that data generated during any of the two successive activation operations of said vehicle instrument panel have been acquired.

6. The method as claimed in claim 1, further comprising the step of resetting said inductive reader before starting each duplication process.

7. The method as claimed in claim 1, further comprising the step of mechanically notching the new key after previously completing the electronic duplication method.

* * * * *